US011443678B2

(12) United States Patent
Park et al.

(10) Patent No.: US 11,443,678 B2
(45) Date of Patent: Sep. 13, 2022

(54) DISPLAY DEVICE

(71) Applicant: SAMSUNG DISPLAY CO., LTD., Yongin-si (KR)

(72) Inventors: Jong Won Park, Yongin-si (KR); Chae Han Hyun, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 161 days.

(21) Appl. No.: 16/808,906

(22) Filed: Mar. 4, 2020

(65) Prior Publication Data

US 2020/0357324 A1 Nov. 12, 2020

(30) Foreign Application Priority Data

May 10, 2019 (KR) ........................ 10-2019-0055082

(51) Int. Cl.
*G06F 3/00* (2006.01)
*G09G 3/20* (2006.01)

(52) U.S. Cl.
CPC ... *G09G 3/2003* (2013.01); *G09G 2310/0267* (2013.01); *G09G 2310/0275* (2013.01); *G09G 2310/08* (2013.01)

(58) Field of Classification Search
None
See application file for complete search history.

(56) References Cited

U.S. PATENT DOCUMENTS 9,398,711 B2 7/2016 In et al.
2017/0206852 A1* 7/2017 Liu ...................... G09G 3/3677
2019/0139469 A1* 5/2019 Kobayashi ............... G09G 3/36
2019/0139496 A1* 5/2019 Peng ........................ G09G 3/32

FOREIGN PATENT DOCUMENTS

KR 10-1945890 1/2019

* cited by examiner

*Primary Examiner* — Michael A Faragalla
(74) *Attorney, Agent, or Firm* — F. Chau & Associates, LLC

(57) ABSTRACT

Systems and methods are provided for a display device that includes a display unit. The display unit includes scan lines and pixels coupled to the scan lines. A timing controller operates in a first mode and a second mode and generates a start signal, based on a vertical synchronization signal provided from the outside. A scan driver generates a scan signal, based on the start signal, and sequentially provides the scan signal to the scan lines. The timing controller generates the start signal immediately after a pulse of the vertical synchronization signal is applied in the first mode, and generates the start signal before a pulse the vertical synchronization signal is applied in the second mode.

23 Claims, 7 Drawing Sheets

DISPLAY DEVICE

CROSS-REFERENCE TO RELATED APPLICATION

The present application claims priority under 35 U.S.C. § 119(a) to Korean patent application 10-2019-0055082 filed on May 10, 2019 in the Korean Intellectual Property Office, the entire disclosure of which is incorporated herein by reference.

BACKGROUND

1. Technical Field

The present disclosure generally relates to a display device.

2. Related Art

Display devices are used to visually present information to users. Various applications such as televisions, computers, mobile phones, and head-mounted displays include a display device.

A display device may include a display panel and a driver. The display panel includes scan lines, data lines, and pixels. The driver includes a scan driver configured to provide a scan signal to the scan lines and a data driver configured to provide data signals to the data lines.

Each of the pixels emits light with a luminance corresponding to a data signal provided through a corresponding data line in response to a scan signal provided through a corresponding scan line.

Recently, various types of wearable electronic devices have been developed. One variation of a wearable display device is mounted on a head-mounted display device called a Head-Mounted Display (HMD). An HMD is a display device worn on or around the head that uses small displays in front of one or both eyes to display an image. There are many applications for an HMD, such as gaming, engineering, aviation, and medicine.

An HMD may provide fast reactivity to keep up with a users' head or body movements. Accordingly, the display device may be driven with a relatively high frequency to rapidly refresh images.

In currently available devices, the display device may be selectively driven in modes having different driving conditions (e.g., different driving frequencies, etc.). However, during a mode switching process, an image may be disconnected or may not be displayed. Accordingly, deterioration of display quality, such as a decrease in luminance, may occur.

SUMMARY

Embodiments provide a display device capable of displaying a seamless image in a mode switching process between modes having different driving conditions.

In accordance with an aspect of the present disclosure, a display device is provided including a display unit including scan lines and pixels coupled to the scan lines; a timing controller configured to operate in a first mode and a second mode, and to generate a start signal based on a vertical synchronization signal; and a scan driver configured to generate a scan signal based on the start signal, and sequentially provide the scan signal to the scan lines, wherein the timing controller generates the start signal immediately after a pulse of the vertical synchronization signal is applied in the first mode and generates the start signal before a pulse the vertical synchronization signal is applied in the second mode.

A first frame period before the mode of the display device is switched from the first mode to the second mode may include two start signals, and the pulse of the vertical synchronization signal may represent the start of a frame period.

In the first frame period, the start signal may have a second pulse immediately after a scan signal generated based on a first pulse of the start signal is provided to the scan lines. A width of a second frame period in the second mode may be smaller than that of the first frame period in the first mode.

The timing controller may generate the start signal, based on a horizontal synchronization signal provided from the outside. A period of the horizontal synchronization signal in the second mode may be smaller than that of the horizontal synchronization signal in the first mode.

In the second mode, a time interval from a time at which the start signal is generated to a time at which the pulse of the vertical synchronization signal is applied may be equal to or smaller than three times of the period of the horizontal synchronization signal.

A number of pulses of the horizontal synchronization signal, which are included in the second frame period, may be equal to that of pulses of the horizontal synchronization signal, which are included in the first frame period.

The timing controller may include: a counter configured to output a counting value by counting a number of pulses of the horizontal synchronization signal, with respect to the vertical synchronization signal;

and a start signal generator configured to generate the start signal by comparing the counting value with a predetermined value.

The counter may count a number of pulses of the horizontal synchronization signal in the first mode and reverse-count a number of pulses of the horizontal synchronization signal from a reference value in the second mode.

The start signal may have a second pulse, while a scan signal generated based on a first pulse of the start signal is being provided to the scan lines in the second mode. The scan signal may be simultaneously provided to at least two of the scan lines in the second mode.

The display unit may include a first display area, a second display area, and a third display area, which are divided by some of the scan lines. The first display area and the third display area may display a color image in the first mode, and display a single color image in the second mode. The start signal may have a second pulse at a time at which the scan signal is provided to a second scan line corresponding to the second display area among the scan lines.

In the second mode, the scan signal may be simultaneously provided to a first scan line corresponding to the first display area and a third scan line corresponding to the third display area among the scan lines.

The display device may further include a data driver configured to generate a data signal. The display unit may further include data lines. The pixels may be coupled to the data lines. The data driver may provide the data lines with black data corresponding to a black color, while a scan signal is being provided to the first scan line corresponding to the first display area among the scan lines in the second mode.

In accordance with another aspect of the present disclosure, a display device is provided including a display unit, a timing controller configured, and a scan driver. The display unit includes scan lines and pixel coupled to the scan lines. The timing controller is configured to operate in a first mode and a second mode, and to generate a start signal based on a vertical synchronization signal provided from the outside. Additionally, the timing controller generates the start signal after a pulse of the vertical synchronization signal is applied in the first mode. The timing controller then generates the start signal at a time at which a pulse of the vertical synchronization signal is applied in the second mode. The scan driver is configured to generate a scan signal based on the start signal, and sequentially provide the scan signal to the scan lines.

The display unit may include a first display area, a second display area, and a third display area, which are divided by some of the scan lines. The first display area and the third display area may display a color image in the first mode, and display a single color image in the second mode. A number of first scan lines corresponding to the first display area among the scan lines may be greater than that of second scan lines corresponding to the third display area among the scan lines.

In accordance with another aspect of the present disclosure, systems and methods of controlling a display device are described. The methods may include selecting a first display mode, transmitting a first vertical synchronization signal to a pixel, transmitting a first start signal to the pixel after the first vertical synchronization signal based on the first display mode, selecting a second display mode, transmitting a second vertical synchronization signal to the pixel, and transmitting a second start signal to the pixel simultaneously to or before the second vertical synchronization signal based on the second display mode.

In some cases, the first display mode comprises a normal display mode and the second display mode comprises a low persistence mode (LPM). In some cases, the second vertical synchronization signal is preceded by a vertical front porch (VFP) period and followed by a vertical back porch (VBP) period based on the second mode.

In some cases, the first vertical synchronization signal and the first start signal are transmitted during a first horizontal synchronization period, and the second vertical synchronization signal and the second start signal are transmitted during a second horizontal synchronization period.

BRIEF DESCRIPTION OF THE DRAWINGS

Example embodiments will now be described more fully hereinafter with reference to the accompanying drawings; however, the example embodiments may be used in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being “between” two elements, the referred element can be the only element between the two elements, or one or more intervening elements may also be present. Like reference numerals refer to like elements throughout.

DETAILED DESCRIPTION

Figure 1:
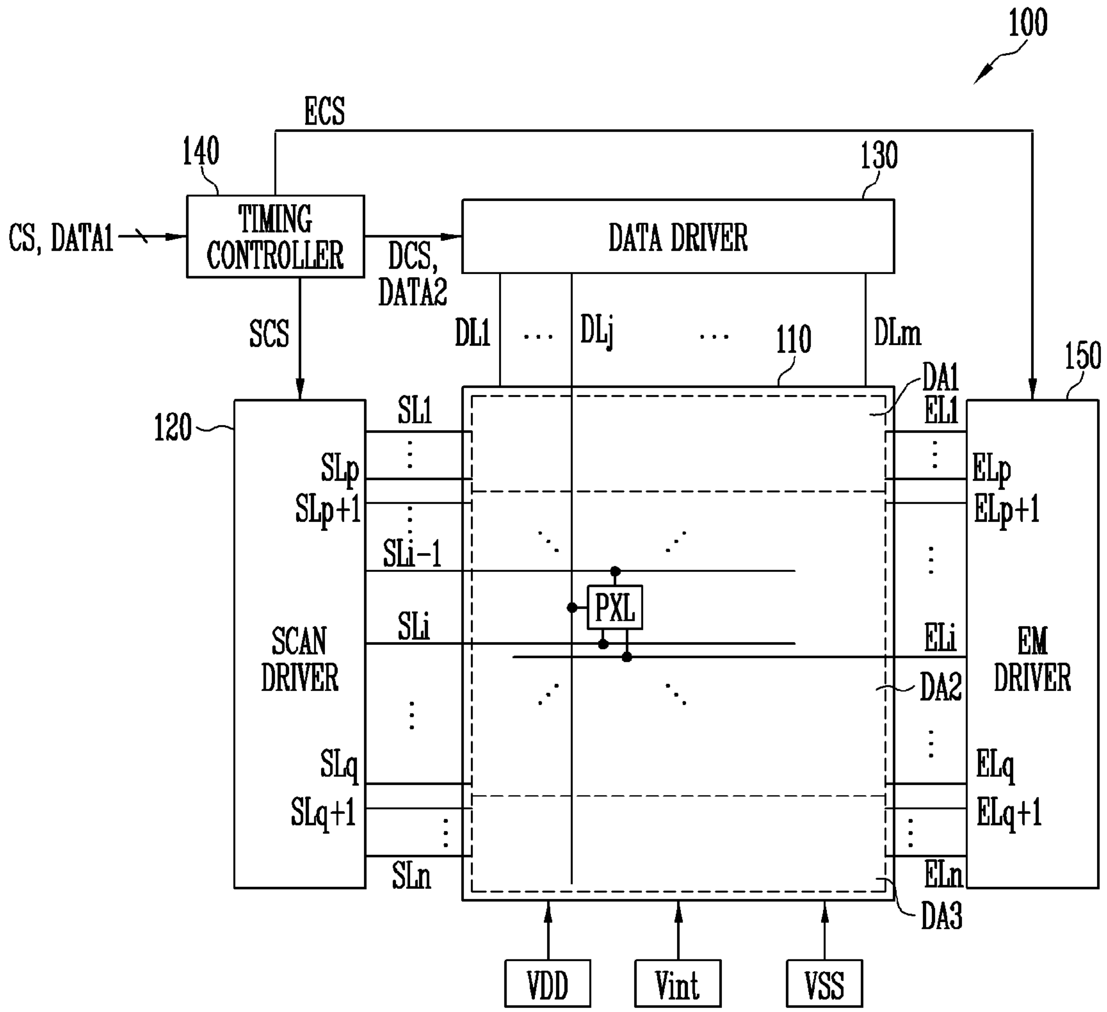
FIG. 1 is a block diagram illustrating a display device in accordance with an embodiment of the present disclosure.

The present disclosure describes systems and methods that provide for a display device with reduced luminescence degradation at the time of mode switching. The mode switching may correspond to a switch from a normal mode to a low persistence mode (LPM). For example, the low persistence mode may be used to prevent motion blur.

In some examples, a display device may perform a mode switch when it needs access to system resources. The mode switch may be implemented through a system call interface or by interruptions such as page faults.

The present disclosure may apply to display devices having different shapes. The present disclosure illustrates particular examples in detail. However, it does not limit the inventive to certain shapes. Rather the disclosure may apply to various changes, equivalent materials and replacements.

In the following embodiments and the attached drawings, elements not directly related to the present disclosure are omitted from depiction, and dimensional relationships among individual elements in the attached drawings are illustrated only for ease of understanding but not to limit the actual scale. It should note that in giving reference numerals to elements of each drawing, like reference numerals refer to like elements even though like elements are shown in different drawings.

FIG. 1 is a block diagram illustrating a display device in accordance with an embodiment of the present disclosure.

Referring to FIG. 1, the display device 100 may include a display unit 110 (or display panel), a scan driver 120 (or gate driver), a data driver 130 (or source driver), a timing controller 140, and an emission driver 150.

The display unit 110 may include scan lines SL1 to SLn, also known as gate lines, where n is a positive integer, data lines DL1 to DLm, where m is a positive integer, emission control lines EL1 to ELn, and pixels PXL. The pixels PXL may be arranged in areas, such as pixel areas, and are defined by the scan lines SL1 to SLn, the data lines DL1 to DLm, and the emission control lines EL1 to ELn.

Each pixel PXL may be coupled to at least one of the scan lines SL1 to SLn, one of the data lines DL1 to DLm, and at least one of the emission control lines EL1 to ELn. For example, the pixel PXL may be coupled to a scan line SLi, a previous scan line SLi-1 adjacent to the scan line SLi, a data line DLj, and an emission control line ELi (i and j are positive integers.

The pixel PXL may be initialized in response to a scan signal, a scan signal provided at a previous time, or a previous gate signal provided through the previous scan line SLi-1. The pixel PXL may store or record a data signal provided through a scan signal, a scan signal provided at a current time, or a gate signal provided through the scan line SLi. The pixel PXL may emit light with a luminance corresponding to the stored data signal in response to an emission control signal provided through the emission control line ELi.

The display unit 110 may include display areas DA1, DA2, and DA3. For example, the display unit 110 may include a first display area DA1, a second display area DA2, and a third display area DA3. The first display area DA1, the second display area DA2, and the third display area DA3 may be distinguished from each other by a quantity of the scan lines SL1 to SLn, and be disposed of adjacent to each other. However, the present disclosure is not limited thereto.

The first display area DA1 may include first to pth scan lines SL1 to SLp (p is a positive integer smaller than n), first to pth emission control lines EL1 to ELp, and pixels PXL.

The second display area DA2 may include (p+1)th to qth scan lines SLp+1 to SLq (q is an integer greater than p and is smaller than n), (p+1)th to qth emission control lines ELp+1 to ELq, and pixels PXL.

The third display area DA3 may include (q+1)th to nth scan lines SLq+1 to SLn, (q+1)th to nth emission control lines ELq+1 to ELn, and pixels PXL. A number (i.e., n-q) of the (q+1)th to nth scan lines SLq+1 to SLn may be equal to that of the first to pth scan lines SL1 to SLp, but the present disclosure is not limited thereto. For example, the number (i.e., n-q) of the (q+1)th to nth scan lines SLq+1 to SLn may be smaller than that (i.e., p) of the first to pth scan lines SL1 to SLp.

In some embodiments, the display device 100 may be driven in a first mode (or normal mode) or a second mode (or low persistence mode or low power mode). The first mode may be a general mode in which an image is displayed in the entire display unit 110, and the second mode may be a mode in which an image is displayed in a portion of the display unit 110 or in which an image (i.e., frame images) having a high refresh rate is displayed. For example, an image may be displayed in the first display area DA1, the second display area DA2, and the third display area DA3 in the first mode, and an image may be displayed in the second display area DA2 in the second mode. In the second mode, any image may not be displayed in the first display area DA1 and the third display area DA3. For example, when the display device 100 is included (or mounted) in a wearable device (e.g., an HMD) or when the display device 100 displays an Always On Display (AOD) image (e.g., a clock image), the display device 100 may be driven in the second mode.

For example, when the display device 100 is included in the wearable device or when the display device 100 serves as the wearable device, the viewing range of a user (or user's eye) with respect to the display device 100 may vary depending on a separation distance between the user and the display device 100. Accordingly, a more rapidly refreshed image (e.g., a color image) may be disposed of in the second display area DA2 that may be within the viewing range of the user. Any image may not be displayed in the first display area DA1 or the third display area DA3, which is out of the viewing range of the user. A single color image (e.g., a black image) may be displayed in the first display area DA1 or the third display area DA3.

Meanwhile, first and second power voltages VDD and VSS may be provided to the display unit 110. The first and second power voltages VDD and VSS may be voltages used for an operation of the pixel PXL, and the first power voltage VDD may have a voltage level higher than that of the second power voltage VSS. Additionally, an initialization power voltage Vint may be provided to the display unit 110. The first and second power voltages VDD and VSS and the initialization voltage Vint may be provided to the display unit 110 from a separate power supply.

The scan driver 120 may generate a scan signal, based on a scan control signal SCS, and sequentially provide the scan signal to the scan lines SL1 to SLn. The scan control signal SCS may include a start signal (or start pulse), clock signals, and the like, and be provided from the timing controller 140. For example, the scan driver 120 may include a shift register (or stage) configured to sequentially generate and output a scan signal in the form of a pulse, which corresponds to the start signal in the form of a pulse by using the clock signals.

The emission driver 150 may generate an emission control signal, based on an emission driving control signal ECS, and sequentially or simultaneously provide the emission control signal to the emission control lines EL1 to ELn. The emission driving control signal ECS may include an emission start signal, emission clock signals, and the like, and be provided from the timing controller 140. For example, the emission driver 150 may include a shift register configured to sequentially generate and output an emission control signal in the form of a pulse, which corresponds to the emission start signal in the form of a pulse by using the emission clock signals.

The data driver 130 may generate data signals, based on image data DATA2 and a data control signal DCS, which are provided from the timing controller 140, and provide the data signals to the display unit 110 (or the pixels PXL). The data control signal DCS is a signal for controlling an operation of the data driver 130 and may include a load signal (or data enable signal) for instructing an output of a valid data signal, and the like.

The timing controller 140 may receive input image data DATA1 and a control signal CS from the outside (e.g., a graphics processor), generate the scan control signal SCS and the data control signal DCS, based on the control signal CS, and generate image data DATA2 by converting the input image data DATA1. The control signal CS may include a vertical synchronization signal, a horizontal synchronization signal, a clock, and the like. The vertical synchronization signal may represent the start of frame data (i.e., data corresponding to a frame period at which one frame image is displayed), and the horizontal synchronization signal may represent the start of a data row (i.e., one data row among a plurality of data rows included in the frame data). For example, the timing controller 140 may convert input image data DATA1 of an RGB format into image data DATA2 of an RGB format, which corresponds to the arrangement of the pixels in the display unit 110.

In some embodiments, the timing controller 140 may generate a start signal, based on the vertical synchronization signal and the horizontal synchronization signal, which are included in the control signal CS.

In an embodiment, the timing controller 140 may generate the start signal immediately after a pulse of the vertical synchronization signal is applied in the first mode, and generate the start signal before a pulse of the vertical synchronization signal is applied in the second mode. A configuration in which the start signal is generated in the timing controller 140 will be described later with reference to FIG. 7.

Meanwhile, at least one of the scan driver 120, the data driver 130, the timing controller 140, and the emission driver 150 may be formed in the display unit 110. Additionally, at least one of the scan driver 120, the data driver 130, the timing controller 140, and the emission driver 150 may be implemented with an Integrated Circuit (IC) to be coupled to the display unit 110 in the form of a Tape Carrier Package (TCP). At least two of the scan driver 120, the data driver 130, the timing controller 140, and the emission driver 150 may be implemented with a single IC.

Figure 2:
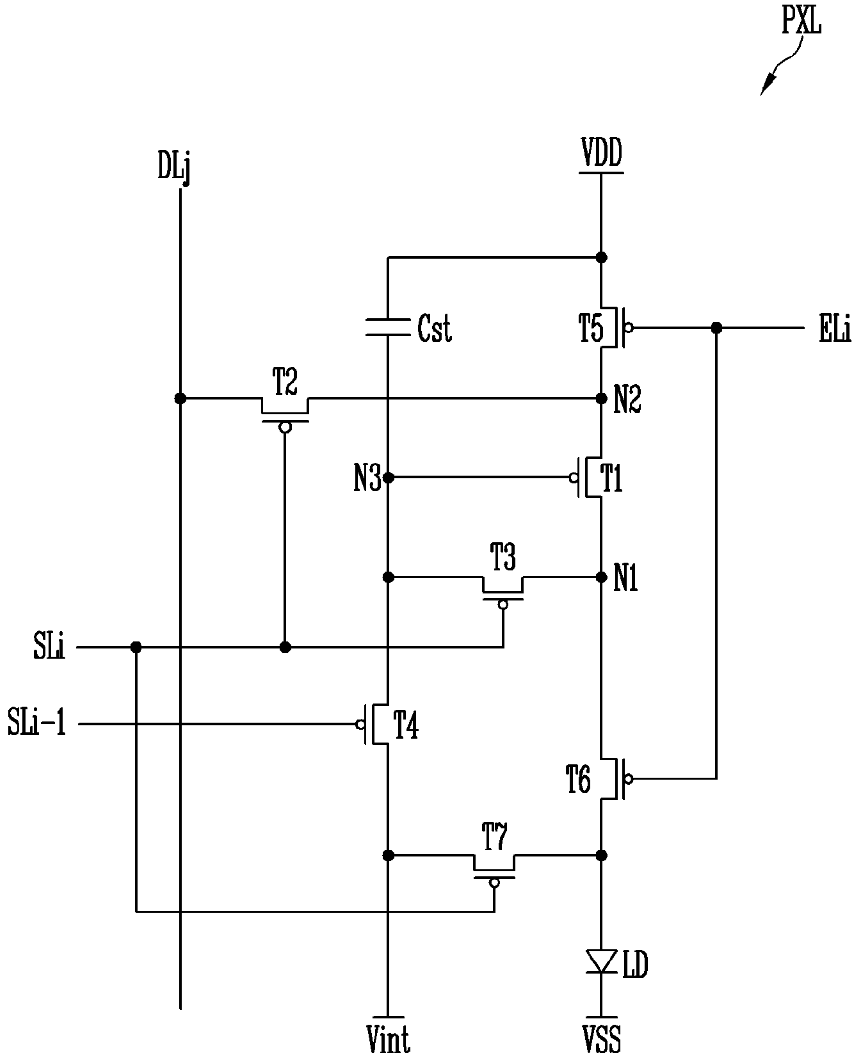
FIG. 2 is a circuit diagram illustrating an example of a pixel included in the display device shown in FIG. 1.

FIG. 2 is a circuit diagram illustrating an example of the pixel included in the display device shown in FIG. 1.

Referring to FIG. 2, the pixel PXL may include first to seventh transistors T1 to T7, a storage capacitor Cst, and a light-emitting device LD.

Each of the first to seventh transistors T1 to T7 may be implemented with a P-type transistor, but the present disclosure is not limited thereto. For example, some of the first to seventh transistors T1 to T7 may be implemented with an N-type transistor.

A first electrode of the first transistor T1 (driving transistor) may be coupled to a second node N2. A first electrode of the first transistor T1 may also be coupled to a first power line (i.e., a power line to which the first power voltage VDD is applied) via the fifth transistor T5. A second electrode of the first transistor T1 may be coupled to a first node N1. A second electrode of the first transistor T1 may also be coupled to an anode of the light-emitting device LD via the sixth transistor T6. A gate electrode of the first transistor T1 may be coupled to a third node N3. The first transistor T1 may control an amount of current flowing from the first power line to a second power line (i.e., a power line that transfers the second power voltage VSS) via the light-emitting device LD, corresponding to a voltage of the third node N3.

The second transistor T2 (switching transistor) may be coupled between a data line DLj and the second node N2. A gate electrode of the second transistor T2 may be coupled to a scan line SLi. The second transistor T2 may be turned on when a scan signal is supplied to the scan line SLi, to electrically couple the data line DLj and the first electrode of the first transistor T1 to each other.

The third transistor T3 may be coupled between the first node N1 and the third node N3. A gate electrode of the third transistor T3 may be coupled to the scan line SLi. The third transistor T3 may be turned on when a scan signal is supplied to the scan line SLi, to electrically couple the first node N1 and the third node N3 to each other. Therefore, the first transistor T1 may be diode-coupled when the third transistor T3 is turned on.

The storage capacitor Cst may be coupled between the first power line and the third node N3. The storage capacitor Cst may store a voltage corresponding to a data signal and a threshold voltage of the first transistor T1.

The fourth transistor T4 may be coupled between the third node N3 and an initialization power line (i.e., a power line that transfers the initialization power voltage Vint). A gate electrode of the fourth transistor T4 may be coupled to a previous scan line SLi-1. The fourth transistor T4 may be turned on when a scan signal is supplied to the previous scan line SLi-1, to supply the initialization power voltage Vint to the first node Ni. The initialization power voltage Vint may be set to have a voltage level lower than that of the data signal.

The fifth transistor T5 may be coupled between the first power line and the second node N2. A gate electrode of the fifth transistor T5 may be coupled to an emission control line ELi The fifth transistor T5 may be turned off when an emission control signal is supplied to the emission control line ELi and be turned on otherwise.

The sixth transistor T6 may be coupled between the first node N1 and the light-emitting device LD. A gate electrode of the sixth transistor T6 may be coupled to the emission control line ELi. The sixth transistor T6 may be turned off when an emission control signal is supplied to the emission control line ELi, and be turned on otherwise.

The seventh transistor T7 may be coupled between the initialization power line and the anode of the light-emitting device LD. A gate electrode of the seventh transistor T7 may be coupled to the scan line SU. The seventh transistor T7 may be turned on when a scan signal is supplied to the scan line SLi, to supply the initialization power voltage Vint to the anode of the light-emitting device LD.

The anode of the light-emitting device LD may be coupled to the first transistor T1 via the sixth transistor T6. A cathode of the light-emitting device LD may be coupled to the second power line. The light-emitting device LD may generate light with a predetermined luminance, corresponding to a current supplied from the first transistor T1. The first power voltage VDD may be set to have a voltage level higher than the second power voltage VSS such that a current flows through the light-emitting device LD.

Figure 3:
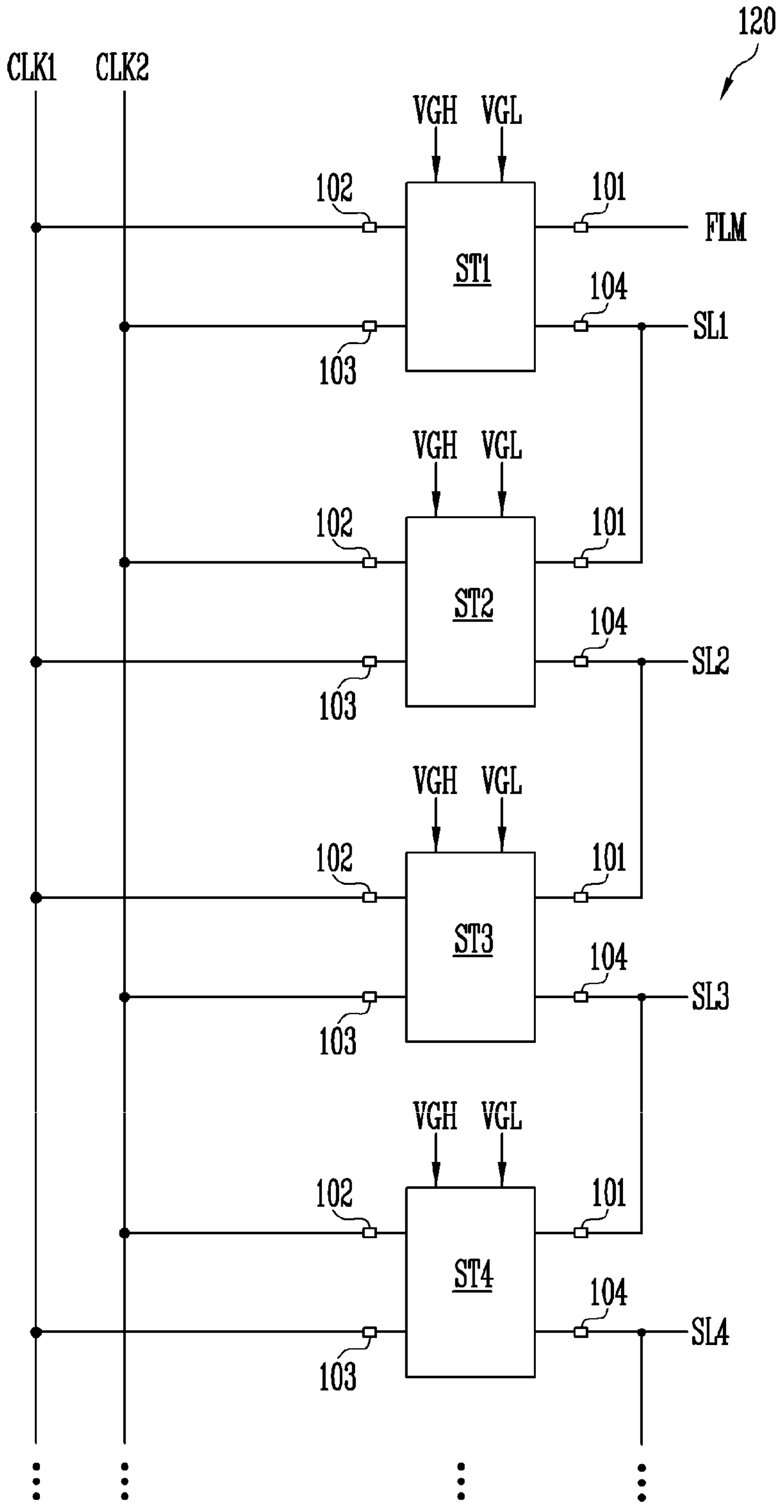
FIG. 3 is a block diagram illustrating an example of a scan driver included in the display device shown in FIG. 1.

FIG. 3 is a block diagram illustrating an example of the scan driver included in the display device shown in FIG. 1.

Referring to FIG. 3, the scan driver 120 may include stages ST1 to ST4 (or scan stages or scan stage circuits). The stages ST1 to ST4 may be respectively coupled to corresponding scan lines SL1 to SL4, and be commonly coupled to clock signal lines (i.e., signal lines that transmit clock signals CLK1 and CLK2). The stages ST1 to ST4 may substantially have the same circuit structure.

Each of the stages ST1 to ST4 may include a first input terminal 101, a second input terminal 102, a third input terminal 103, and an output terminal 104.

The first input terminal 101 may receive a carry signal. The carry signal may include a start signal FLM (or start pulse) or an output signal (i.e., a scan signal) of a previous stage (or previous end-stage). For example, the first input terminal 101 of a first stage ST1 may receive the start signal FLM, and the first input terminal 101 of each of the other stages ST2 to ST4 may receive a scan signal of a previous stage. That is, a scan signal of a previous stage of a corresponding stage may be provided as the carry signal to the corresponding stage.

The second input terminal 102 of the first stage ST1 may be coupled to a first clock signal line to receive a first clock signal CLK1, and the third input terminal 103 of the first stage ST1 may be coupled to a second clock signal line to receive a second clock signal CLK2. The second input terminal 102 of a second stage ST2 may be coupled to the second clock signal line to receive the second clock signal CLK2, and the third input terminal 103 of the second stage ST2 may be coupled to the first clock signal line to receive the first clock signal CLK1. Similar to the first stage ST1, the second input terminal 102 of a third stage ST3 may be coupled to the first clock signal line to receive the first clock signal CLK1, and the third input terminal 103 of the third stage ST3 may be coupled to the second clock signal line to receive the second clock signal CLK2. Similar to the second stage ST2, the second input terminal 102 of a fourth stage ST4 may be coupled to the second clock signal line to receive the second clock signal CLK2, and the third input terminal 103 of the fourth stage ST4 may be coupled to the first clock signal line to receive the first clock signal CLK1. That is, the first clock signal line and the second clock signal line may be alternately coupled to the second input terminal 102 and the third input terminal 103, or the first clock signal CLK1 and the second clock signal CLK2 may be alternately provided to the second input terminal 102 and the third input terminal 103 of each stage.

Pulses of the first clock signal CLK1 provided through the first clock signal line and pulses of the second clock signal CLK2 provided through the second clock signal line may not temporally overlap with each other. Each of the pulses may have a gate-on voltage level (or turn-on voltage level). The gate-on voltage level may be a voltage level provided to a gate electrode of a transistor provided in each of the stages ST1 to ST4 to turn on the transistor.

The stages ST1 to ST4 may receive a first voltage VGH (or high-voltage level) and a second voltage VGL (or low-voltage level). The first voltage VGH may be set to a gate-off voltage level (or turn-off voltage level), and the second voltage VGL may be set to the gate-on voltage level.

Figure 4:
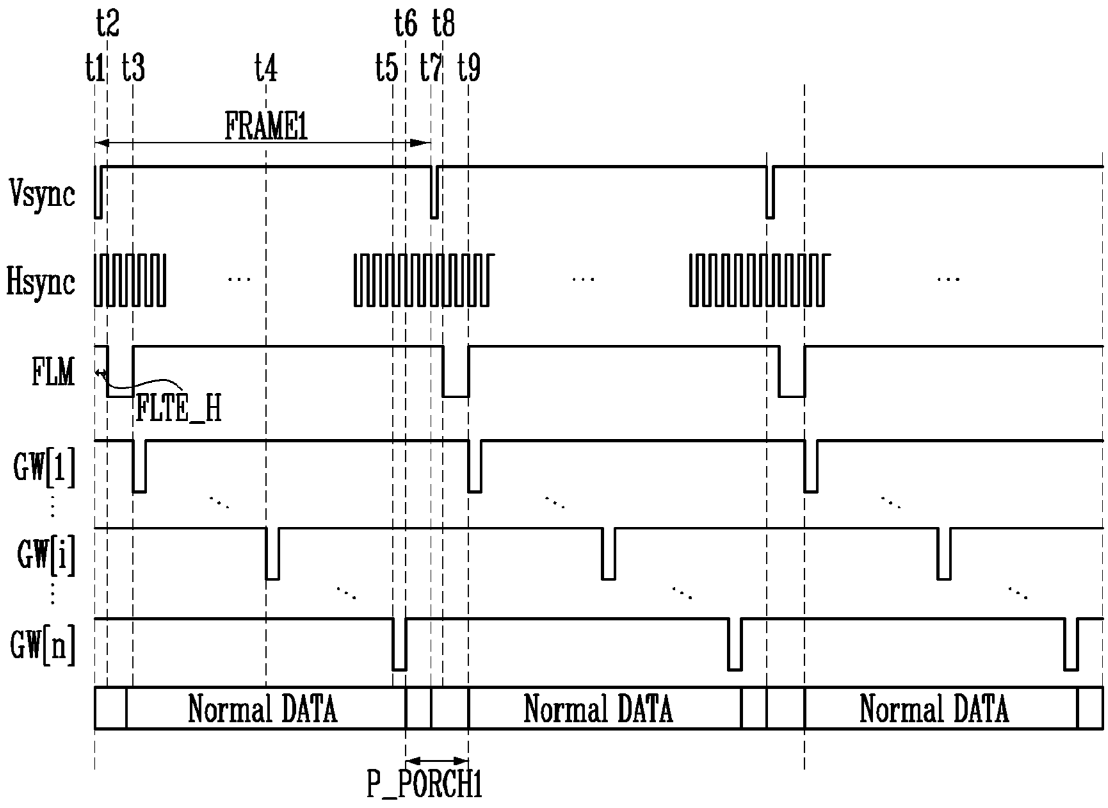
FIG. 4 is a waveform diagram illustrating an example of signals measured in the display device shown in FIG. 1.

FIG. 4 is a waveform diagram illustrating an example of signals measured in the display device shown in FIG. 1. In FIG. 4, signals measured in the display device driven in the first mode are illustrated.

Referring to FIGS. 1 and 4, a vertical synchronization signal Vsync defines a frame period (or start time of the frame period) at which a frame image is displayed. Additionally, a horizontal synchronization signal Hsync defines a horizontal period at which a scan signal is output from the scan driver 120 or at which a data signal is output from the data driver 130.

A horizontal synchronization signal Hsync may be a pulse signal periodically having a logic low level. The period of the horizontal synchronization signal Hsync may be defined as one horizontal time.

At a first time t1 (or at a first time point), the vertical synchronization signal Vsync may be changed from a logic high level to the logic low level. The vertical synchronization signal Vsync may have a pulse width equal to that of the horizontal synchronization signal Hsync, but the present disclosure is not limited thereto.

At a second time t2, a start signal FLM may be changed from the logic high level (or gate-off voltage level) to the logic low level (or gate-on voltage level). Although a case where the second time t2 is a time elapsing by one horizontal time from the first time t1 is illustrated in FIG. 4, the present disclosure is not limited thereto.

A first time interval FLTE_H shown in FIG. 4 may be preset as a time interval that defines an output time of the start signal FLM with respect to the horizontal synchronization signal Hsync. For example, the first time interval FLTE_H may correspond to two horizontal times or more.

Based on a pulse of the vertical synchronization signal Vsync and a pulse of the horizontal synchronization signal Hsync the timing controller 140 (see FIG. 1) may generate a start signal FLM having the logic low level. The timing controller 140 may then output the start signal FLM having the logic low level at a time elapsing by a specific time from the time at which the pulse of the vertical synchronization signal Vsync is generated. For example, the timing controller 140 may output a start signal FLM having the logic low level at the second time t2 elapsing by one horizontal time from the first time t1 at which the pulse of the vertical synchronization signal Vsync is generated.

Meanwhile, although a case where the pulse width of the start signal FLM corresponds to two horizontal times is illustrated in FIG. 4, the present disclosure is not limited thereto, and the pulse width of the start signal FLM may correspond to one horizontal time or three horizontal times or more.

At a third time t3, the start signal FLM may be changed from the logic low level to the logic high level.

Additionally, at the third time t3, a first scan signal GW[1] (i.e., a scan signal provided to the first scan line SL1 described with reference to FIG. 4) may be changed from the logic high level to the logic low level. That is, the scan driver 120 described with reference to FIG. 3 may output a first scan signal GW[1] corresponding to the start signal FLM having the logic low level.

According to the configuration of the scan driver 120 described with reference to FIG. 3, scan signals GW[1] to GW[n] may, sequentially, have the logic low level. The scan signals GW[1] to GW[n], having the logic low level, may be sequentially provided to the scan lines SL1 to SLn (see FIG. 1). For example, at a fourth time t4, an ith scan signal GW[i] having the logic low level may be provided to an ith scan line SLi (see FIG. 1).

At a fifth time t5, an nth scan signal GW[n] provided to the nth scan line SLn (see FIG. 1) may be changed from the logic high level to the logic low level. At a sixth time t6, the nth scan signal GW[n] may be changed to the logic high level.

A data signal output from the data driver 130 (see FIG. 1) may have a valid value Normal DATA (or voltage corresponding to the valid value) in a period (i.e., an period between the third time t3 and the sixth time t6) in which the scan signals GW[1] to GW[n] are sequentially output. The display period (or record period) may be defined as the period in which the scan signals GW[1] to GW[n], having the logic low level, are sequentially output.

Subsequently, at a seventh time t7, the vertical synchronization signal Vsync may be changed from the logic high level to the logic low level.

At an eighth time t8 corresponding to the second time t2, the start signal FLM may be changed from the logic high level to the logic low level. At a ninth time t9 corresponding to the third time t3, the first scan signal GW[1] may be changed from the logic high level to the logic low level.

That is, a period between the first time t1 and the seventh time t7 may be defined as one frame period (e.g., a first frame period FRAME1), and the display device 100 may repeatedly operate by using the frame period as a period.

Meanwhile, during a period at which the scan signals GW[1] to GW[n] having the logic low level are not output in the frame period, the data signal may have an invalid value (or voltage corresponding to the invalid value). For example, the data signal may have a voltage corresponding to a block image (or block color or block grayscale value) in a period between the first time t1 and the third time t3, a period between the sixth time t6 and the ninth time t9, etc.

A period at which the scan signals GW[1] to GW[n] having the logic low level are not output in the frame period may be defined as a first porch period P_PORCH1 (or vertical porch or blank period). The sixth time t6 and the ninth time t9 is an example of a period, and a frame period is a period between an end time of a display period and a start time of another display period.

Figure 5:
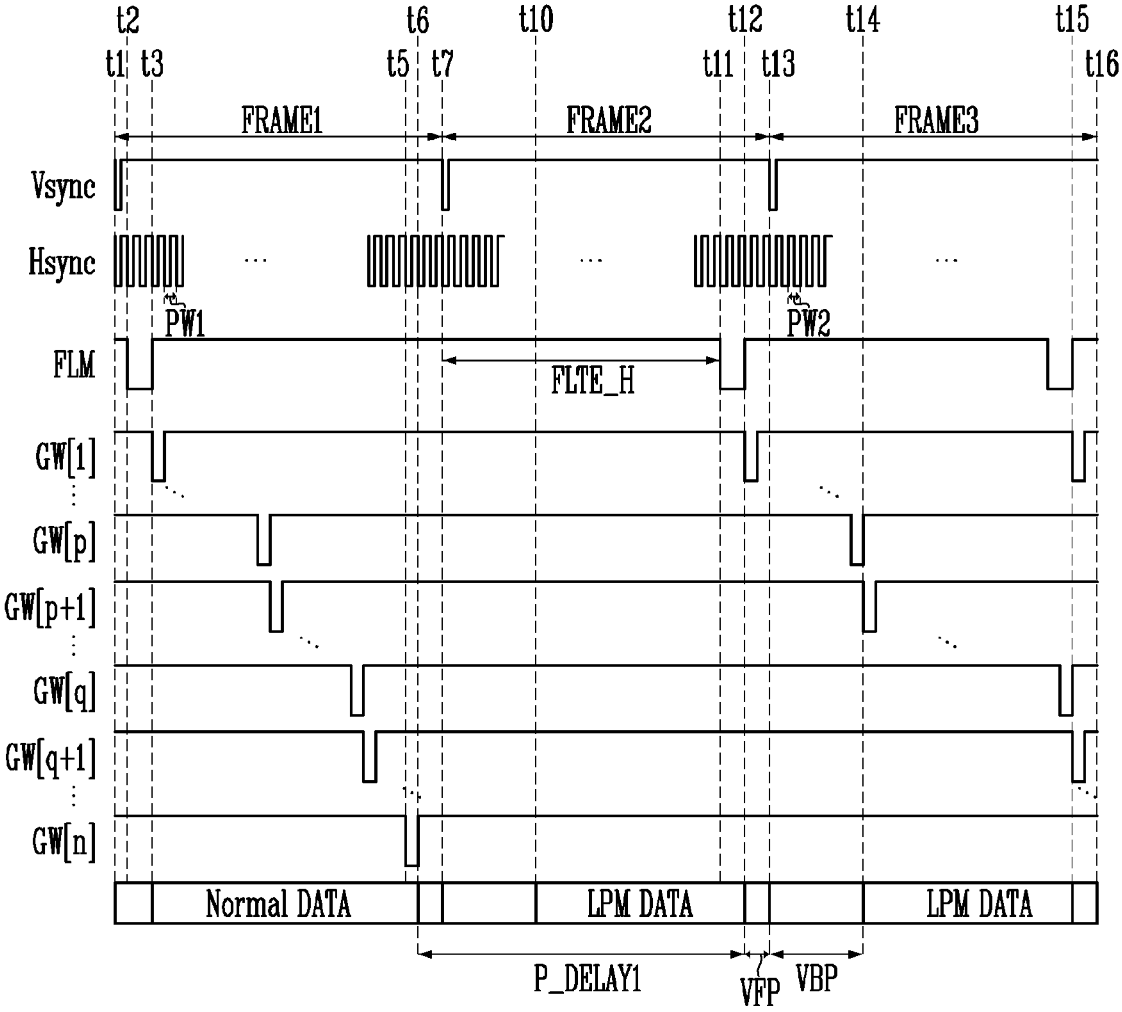
FIG. 5 is a waveform diagram illustrating a comparative example of the signals measured in the display device shown in FIG. 1.

FIG. 5 is a waveform diagram illustrating a comparative example of the signals measured in the display device shown in FIG. 1. In FIG. 5, signals measured in the display device 100 that may be driven in the second mode or of which the mode is switched from the first mode to the second mode are illustrated.

Referring to FIGS. 1, 4, and 5, an operation of the display device 100 at a first frame period FRAME1 is substantially identical to that of the display device 100, which is described with reference to FIG. 4, and therefore, overlapping descriptions will not be repeated.

In a period (i.e., a display period) between the third time t3 and the seventh time T7, First to pth scan signals GW[1] to GW[p] may be sequentially provided to the first to pth scan lines SL1 to SLp corresponding to the first display area DA1 described with reference to FIG. 1. Subsequently, (p+1)th to qth scan signals GW[p+1] to GW[q] may be sequentially provided to the (p+1)th to qth scan lines SLp+1 to SLq corresponding to the second display area DA2 described with reference to FIG. 1. Subsequently, (q+1)th to nth scan signals GW[q+1] to GW[n] may be sequentially provided to the (q+1)th to nth scan lines SLq+1 to SLn corresponding to the third display area DA3 described with reference to FIG. 1.

Meanwhile, during or before first frame period FRAME1, a mode control signal for allowing the mode of the display device 100 from the first mode to the second mode may be provided to the display device 100 (see FIG. 1) (or the timing controller 140) from an outside source (e.g., a graphics processor).

At a seventh time t7, the mode of the display device 100 may start being switched to the second mode.

In some embodiments, the period of the horizontal synchronization signal Hsync may be decreased. For example, a second period PW2 (i.e., one horizontal time in the second mode) of the horizontal synchronization signal Hsync at a second frame period FRAME2 (and a third frame period FRAME3) at which the display device 100 is driven in the second mode may be decreased to about 60% of a first period PW1 of the horizontal synchronization signal Hsync in the first frame period FRAME1 at which the display device 100 may be driven in the first mode.

Thus, the width of a frame period is decreased, and a frame image is displayed with a relatively low persistence during a relatively short time. Further, deterioration of display quality such as motion blur can be reduced or prevented.

Additionally, in the second frame period FRAME2 at which the display device 100 is driven in the second mode, the first porch period P_PORCH1 (i.e., the period at which the scan signals GW[1] to GW[n] having the logic low level are not output) described with reference to FIG. 4 may be eliminated.

Thus, the width of a frame period is decreased, and a frame image is displayed with a lower persistence. Further, the degradation of display quality can be further reduced.

To eliminate the first porch period P_PORCH1, a first scan signal is to be output at a current frame period, immediately after a last scan signal is output at a previous frame period, and the start signal FLM is to be generated at the last of the previous frame period (or period at which the scan signals GW[1] to GW[n] having the logic low level are output).

As shown in FIG. 5, the start signal FLM may have a pulse having the logic low level at an eleventh time t11. The eleventh time t11 may be a time elapsing by a first time interval FLTE_H from the seventh time t7 at which the vertical synchronization signal Vsync having the logic low level appears. The first time interval FLTE_H may have a width almost equal to that of a frame period in the second mode.

When the start signal FLM is delayed by the first time interval FLTE_H, the scan signals GW[1] to GW[n] may not output in the second frame period FRAME2.

Thus, a data signal recorded in the pixel PXL (see FIG. 2) is maintained by the scan signals GW[1] to GW[n] in the first frame period FRAME1. The pixel PXL can additionally emit light during the second frame period FRAME2 (or a first delay time P_DELAY1), based on a pre-recorded data signal.

A driving current flowing through the light-emitting device LD via the first transistor T1, described with reference to FIG. 2, may be leaked through the third transistor T3 and the fourth transistor T4. The voltage of the third node N3 is changed by the leakage current when time elapses. Additionally, the driving current is continuously decreased, and the luminance of the pixel PXL may be decreased. Since the luminance during one frame period is decreased within 1% of a target luminance, a decrease in luminance in the first frame period FRAME1 (or a decrease in luminance while the display device 100 is being driven in the first mode) may not be viewed by a user. However, when the luminance is additionally decreased during the second frame period FRAME2, a decrease in luminance in the second frame period FRAME2 may be viewed by the user.

At a twelfth time t12, the start signal FLM may be changed from the logic low level to the logic high level, and the scan signals GW[1] to GW[n] may sequentially have the logic low level in response to the start signal FLM.

For example, at a period between the twelfth time t12 and a fourteenth time t14, the first to pth scan signals GW[1] to GW[p] corresponding to the first display area DA1 described with reference to FIG. 1 may sequentially have the logic low level. At a period between the fourteenth time t14 to a fifteenth time t15, the (p+1)th to qth scan signals GW[p+1] to GW[q] corresponding to the second display area DA2 described with reference to FIG. 1 may sequentially have the logic low level.

Meanwhile, at a thirteenth time t13, the vertical synchronization signal Vsync may have a pulse having the logic low level, and the start signal FLM may have a pulse having the logic low level just before the fifteenth time t15, corresponding to the vertical synchronization signal Vsync. At the fifteenth time t15, the first scan signal GW1 may again have the logic low level.

Also, at the fifteenth time t15, the (q+1)th scan signal GW[q+1] may have the logic low level. At a period between the fifteenth time t15 and the sixteenth time t16, the (q+1)th to nth scan signals GW[q+1] to GW[n] corresponding to the third display area DA3 described with reference to FIG. 1 may sequentially have the logic low level.

That is, in the second mode, the first to pth scan signals GW[1] to GW[p] may be sequentially provided to the first to pth scan lines SL1 to SLp corresponding to the first display area DA1 described with reference to FIG. 1. At the same time, the (q+1)th to nth scan signals GW[q+1] to GW[n] may be sequentially provided to the (q+1)th to nth scan lines SLq+1 to SLn corresponding to the third display area DA3 described with reference to FIG. 1.

As described with reference to FIG. 1, the same black image is displayed in the first display area DA1 and the third display area DA3 in the second mode, and accordingly, a data signal corresponding to the same black grayscale value can be provided to the first display area DA1 and the third display area DA3. Thus, a scan signal is simultaneously provided to the first to pth scan lines SL1 to SLp corresponding to the first display area DA1 and the (q+1)th to nth scan lines SLq+1 to SLn corresponding to the third display area DA3, and the width of a frame period can be further decreased.

Since the black image is displayed in the first display area DA1 and the third display area DA3, in the second mode, the data signal may have a voltage corresponding to the black grayscale value at the period between the twelfth time t12 and the fourteenth time t14. Thus, the first to pth scan signals GW[1] to GW[p] corresponding to the first display area DA1 have the logic low level. The data signal may have a voltage corresponding to the black grayscale value during a previous black period VFP (or vertical front porch) and a next black period VBP (or vertical back porch), which are divided based on the vertical synchronization signal Vsync (e.g., with respect to the thirteen time t13). The previous black period VFP and the next black period VBP (the period between the twelfth time t12 and the fourteenth time t14) may be commonly referred to as a black period.

Meanwhile, since an image is displayed in the second display area DA in the second mode, the data signal may have a valid value LPM DATA at an period between the fourteenth time t14 and the fifteenth time 15, at which the (p+1)th to qth scan signals GW[p+1] to GW[p] corresponding to the second display area DA2 have the logic low level.

As described with reference to FIG. 5, the start signal FLM may be delayed by a first time interval FLTE_H (about one frame period) based on the vertical synchronization signal Vsync, to have a pulse having the logic low level at a time at which the pth scan signal PW[p] (i.e., a last scan signal provided to the second display area DA2) has a logic level. However, the luminance is additionally decreased during the first time interval FLTE_H, and therefore, the decrease in luminance may be viewed by the user.

In accordance with the embodiment of the present disclosure, the start pulse FLM having the logic low level can be generated in the display device 100, before or simultaneously, with the time at which the vertical synchronization signal Vsync has the pulse having the logic low level.

Thus, a display device 100 may select a first display mode, transmit a first vertical synchronization signal Vsync to a pixel, transmit a first start signal FLM to the pixel after the first vertical synchronization signal Vsync based on the first display mode (e.g., as described with reference to FIG. 4). The display device 100 may select a second display mode, transmit a second vertical synchronization signal Vsync to the pixel, and transmit a second start signal FLM to the pixel before the second vertical synchronization signal Vsync based on the second display mode (e.g., as described with reference to FIG. 5 and in FIG. 7 below). In another embodiment, described with reference to FIG. 8, the second start signal FLM is transmitted to the pixel simultaneously with the second vertical synchronization signal Vsync.

In some cases, the first display mode comprises a normal display mode and the second display mode comprises a low persistence mode (LPM). In some cases, the second vertical synchronization signal Vsync is preceded by a vertical front porch VFP and followed by a vertical back porch VBP based on the second mode.

In some cases, the first vertical synchronization signal Vsync and the first start signal FLM are transmitted during a first horizontal synchronization signal Hsync, and the second vertical synchronization signal and the second start signal are transmitted during a second horizontal synchronization signal Hsync.

Figure 6:
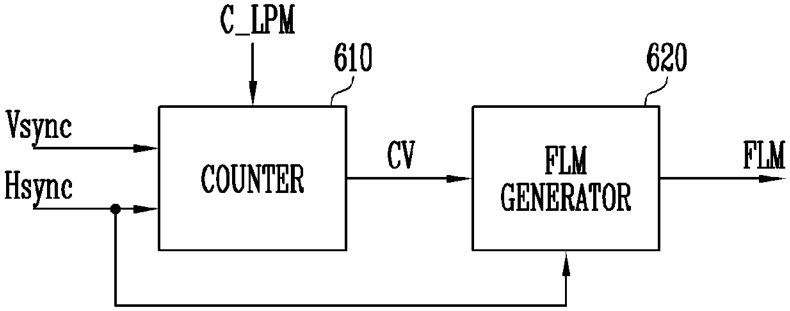
FIG. 6 is a block diagram illustrating an example of a timing controller included in the display device shown in FIG. 1.

FIG. 6 is a block diagram illustrating an example of the timing controller included in the display device shown in FIG. 1. In FIG. 6, the timing controller 140 is briefly illustrated with respect to a function of generating the start signal FLM.

Referring to FIGS. 1, 5, and 6, the timing controller 140 may include a counter 610 (or counting circuit) and a start signal generator 620 (or start signal generation circuit). The counter 610 and the start signal generator 620 may be implemented with a logic circuit.

The counter 610 may count pulses (or a number of pulses) of the horizontal synchronization signal Hsync, with respect to the vertical synchronization signal Vsync, and output a counting value CV of the pulses.

An example will be described with reference to FIG. 5. The counter 610 may start counting pulses of the horizontal synchronization signal Hsync at the first time t1 at which the pulses of the horizontal synchronization signal Hsync are applied. The counter 610 may also reset a counting value of the pulses at the seventh time t7 at which a next pulse of the vertical synchronization signal Vsync is applied, and re-count pulses of the horizontal synchronization signal Hsync.

A number of pulses of the horizontal synchronization signal Hsync in the second mode may be equal to that of pulses of the horizontal synchronization signal Hsync. The quantity of pulses of the horizontal synchronization signal Hsync is included in the second frame period FRAME2 or the third frame period FRAME3. Pulses of the horizontal synchronization signal Hsync are included in the first frame period FRAME1, in the first mode. However, the present disclosure is not limited thereto.

In some embodiments, the counter 610 may count pulses of the horizontal synchronization signal Hsync in the reverse direction with respect to the vertical synchronization in response to a mode switching control signal C_LPM (or a mode switching signal from the first mode to the second mode). The mode switching control signal C_LPM is a mode control signal for allowing the mode of the display device 100 to be switched from the first mode to the second mode. The mode switching control signal C_LPM may be included in the control signal CS described with reference to FIG. 1, and be provided to the timing controller 140 from the outside (e.g., a graphics processor).

An example will be described with reference to FIG. 5; the counter 610 may start reverse-counting pulses of the horizontal synchronization signal Hsync from a reference value (or reference number) at the first time t1 at which the pulse of the vertical synchronization signal Vsync is applied.

In an example, when the counter 610 counts pulses of the horizontal synchronization signal Vsync in the forward direction in the first mode, the counter 610 may output a counting value CV of 3 at the third time t3. In another example, when the counter 610 counts pulses of the horizontal synchronization signal Vsync in the reverse direction in the second mode, the counter 610 may output a counting value CV of 3 at the fifth time t5. Operations of the display device 100, which is related to this, will be described later with reference to FIG. 7.

The start signal generator 620 may compare the counting value CV with a predetermined value, and generate a start signal FLM, based on the horizontal synchronization signal Hsync when the counting value CV is equal to the predetermined value. The generated start signal FLM may be provided to the scan driver 120.

An example will be described with reference to FIG. 5. The start signal generator 620 may receive a counting value CV of 1 at the second time t2 (or just before the second time t2). When the counting value CV of 1 is equal to the predetermined value (e.g., a value of 1), the start signal generator 620 may generate the start signal FLM by sampling and holding the horizontal synchronization signal Hsync.

As described with reference to FIG. 6, the timing controller 140 generates the start signal FLM after the pulse of the vertical synchronization signal Vsync is applied by counting pulses of the horizontal synchronization signal Hsync in the forward direction in the first mode, and generates the start signal FLM before the pulse of the vertical synchronization signal Vsync is applied by counting pulses of the horizontal synchronization signal Hsync in the reverse direction in the second mode. Thus, the first delay time P_DELAY described with reference to FIG. 5 does not occur, and display quality is not degraded in the process of allowing the mode of the display device 100 to be switched from the first mode to the second mode.

Figure 7:
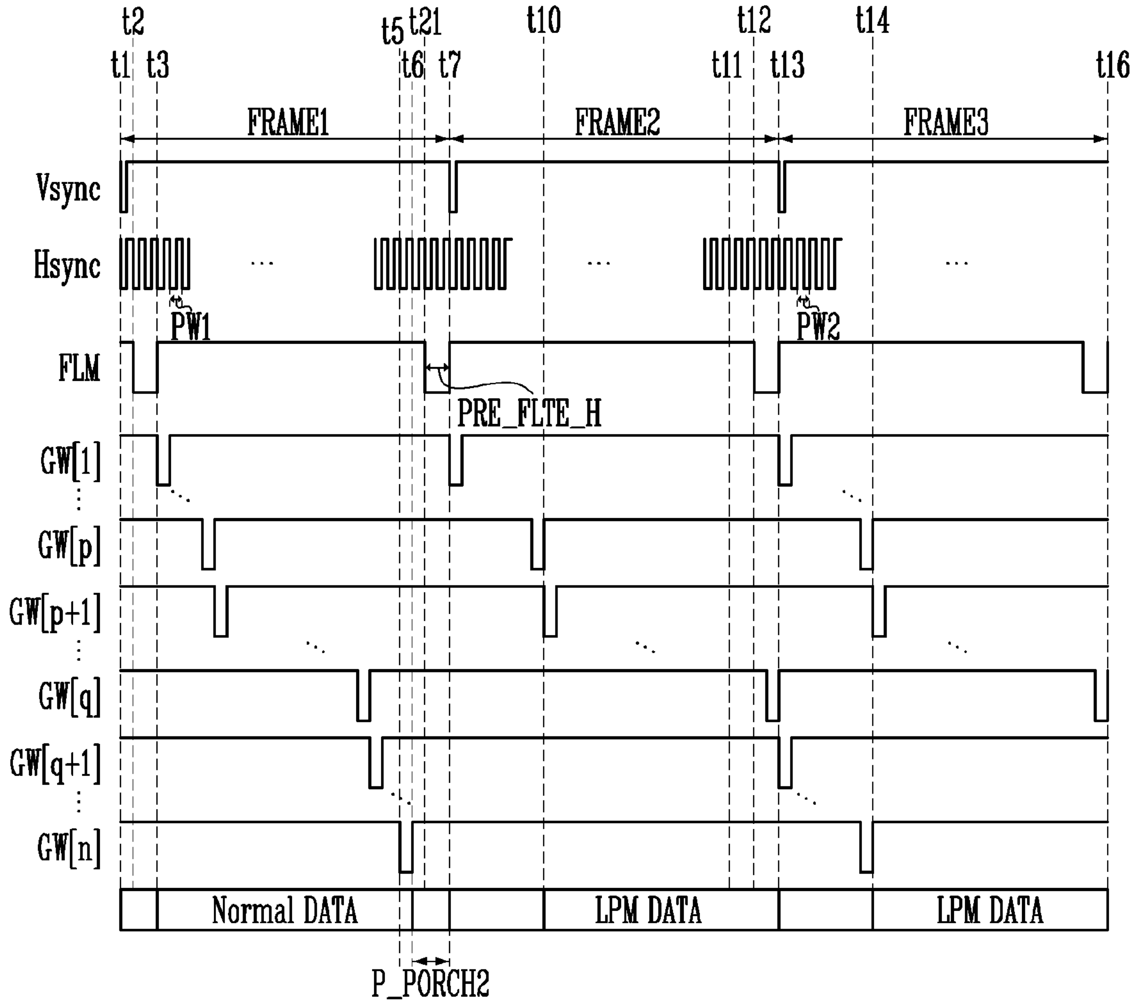
FIG. 7 is a waveform diagram illustrating another example of the signals measured in the display device shown in FIG. 1.

FIG. 7 is a waveform diagram illustrating another example of the signals measured in the display device shown in FIG. 1. In FIG. 7, a waveform diagram corresponding to that shown in FIG. 5 is illustrated.

Referring to FIGS. 1, 5, 6, and 7, an operation of the display device 100 at a first frame period FRAME1 may be substantially identical to that of the display device 100, which is described with reference to FIG. 5. Additionally, a vertical synchronization signal Vsync and a horizontal synchronization signal Hsync may be substantially identical to those described with reference to FIG. 5. Therefore, overlapping descriptions will not be repeated.

In the first frame period FRAME1 or before the first frame period FRAME1, a mode switching control signal C_LPM (see FIG. 6) may be provided to the timing controller 140. A mode switching control signal C_LPM is used to allow the mode of the display device 100 to be switched from the first mode to the second mode.

The timing controller 140 may reverse-count pulses of the horizontal synchronization signal Hsync, and generate and output a start signal FLM at a sixth time t6 at which a counting value CV (or reverse-counting value) becomes 2.

The sixth time t6 at which the start signal FLM having the logic low level is output in the second mode may be a time-delayed by a second time interval PRE_FLTE_H from a seventh time t7 at which a pulse of the vertical synchronization signal Vsync is generated. The magnitude of the second time interval PRE_FLTE_H may be equal to that of the first time interval FLTE_H described with reference to FIG. 4.

Meanwhile, since the start signal FLM is generated based on the horizontal synchronization signal Hsync in the first frame period FRAME1 (i.e., the horizontal synchronization signal Hsync having a first period PW in the first mode), the start signal FLM may be output at a porch period P_PORCH2 of the first frame period FRAME1 (i.e., after the scan signals GW[1] to GW[n] are output in the first frame period FRAME1). That is, two start signals FLM may be output in the first frame period FRAME1 just before the mode of the display device 100 is switched from the first mode to the second mode (i.e., at a period between a pulse of the vertical synchronization signal Vsync and a next pulse adjacent to the pulse of the vertical synchronization signal Vsync).

At the seventh time t7, the first scan signal GW[1] may be changed to the logic low level in response to the pulse of the start signal FLM. After the seventh time t7, the scan signals GW[1] to GW[n] may sequentially have the logic low level.

For example, at a period between the seventh time t7 and a tenth time t10, the first to pth scan signals GW[1] to GW[p] corresponding to the first display area described with reference to FIG. 1 may sequentially have the logic low level. At a period between the tenth time t10 and a thirteenth time t13, the (p+1)th to qth scan signals GW[p+1] to GW[q] corresponding to the second display area DA2 described with reference to FIG. 1 may sequentially have the logic low level.

At the thirteenth time t13, the vertical synchronization signal Vsync may have a pulse having the logic low level, and the start signal FLM may have a pulse having the logic low level at a twelfth time t12 before a specific time (e.g., a time equal to or smaller three horizontal times, or two horizontal times) from the thirteenth time t13, corresponding to the vertical synchronization signal Vsync.

Also, at the thirteenth time t13, the (q+1)th scan signal GW[q+1] may have the logic low level. At a period between the thirteenth time t13 and a fourteenth time t14, the (q+1)th to nth scan signals GW[q+1] to GW[n] corresponding to the third display area DA3 described with reference to FIG. 1 may sequentially have the logic low level.

Since a black image is displayed in the first display area DA1 (and the third display area DA3) in the second mode, the data signal may have a voltage corresponding to the black grayscale value at an period between the twelfth time t12 and the fourteenth time t14, at which the first to pth scan signals GW[1] to GW[p] corresponding to the first display area DA1 have the logic low level.

Meanwhile, the previous black period VFP described with reference to FIG. 5 (i.e., a period at which a voltage corresponding to the black grayscale value is output just before the vertical synchronization signal Vsync is generated) may be set to a value of 0.

As described with reference to FIG. 7, the start signal having the logic low level is generated and output earlier than the vertical synchronization signal Vsync having the logic low level in the first frame period FRAME1 (or at the porch period P_PORCH2 of the first frame period FRAME1) just before the mode of the display device 100 is switched from the first mode to a second mode. Accordingly, the first delay time P_DELAY described with reference to FIG. 5 is eliminated, and deterioration of display quality in the process of allowing the mode of the display device 100 to be switched from the first mode to a second mode can be prevented.

Figure 8:
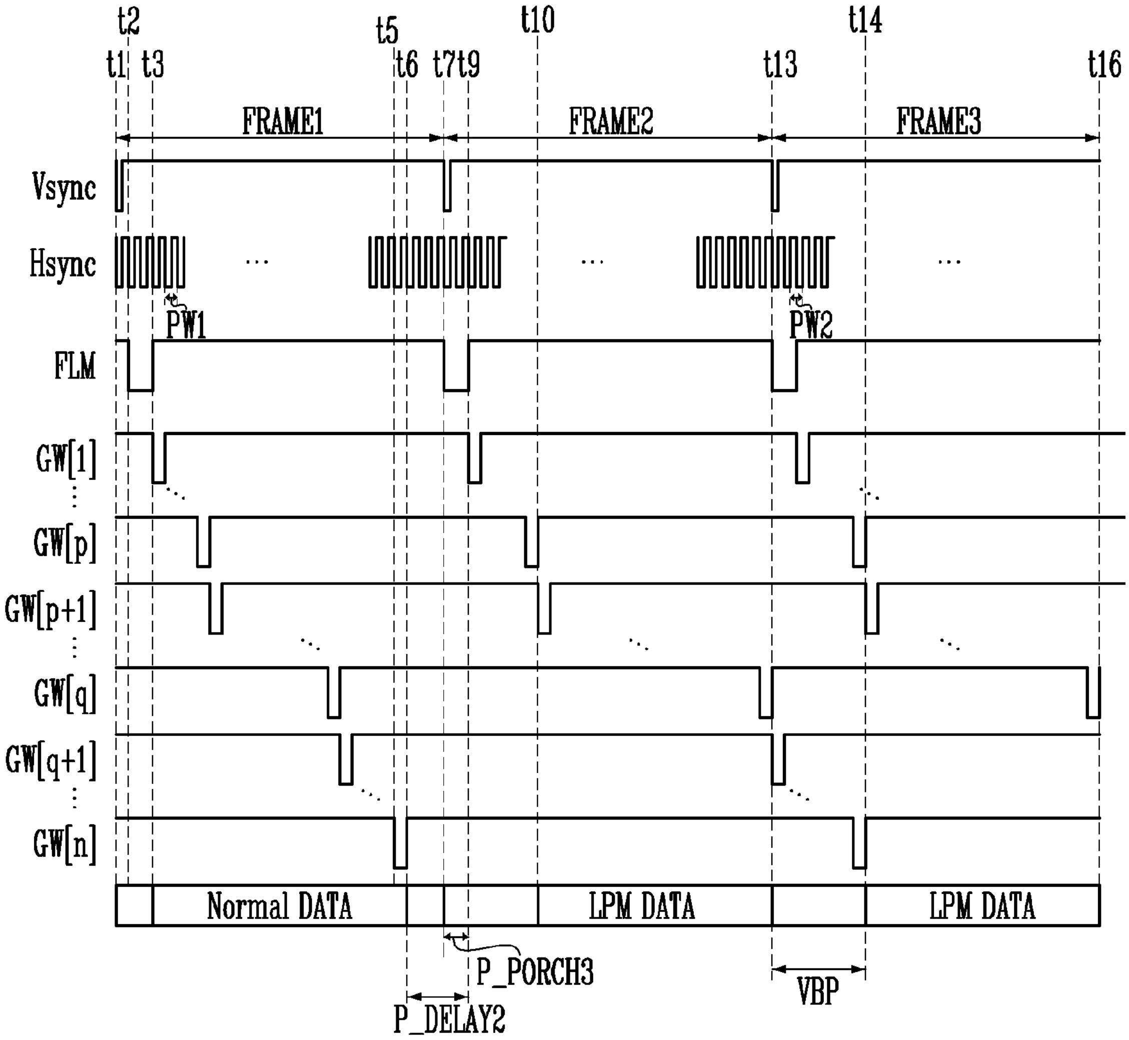
FIG. 8 is a waveform diagram illustrating still another example of the signals measured in the display device shown in FIG. 1.

FIG. 8 is a waveform diagram illustrating still another example of the signals measured in the display device shown in FIG. 1. In FIG. 8, a waveform diagram corresponding to that shown in FIG. 7 is illustrated.

Referring to FIGS. 1, 7, and 8, a start signal FLM in the second mode is different from that described with reference to FIG. 7, in that the start signal FLM has the logic low level simultaneously with the vertical synchronization signal Vsync.

Except for the start signal FLM, signals (i.e., the scan signals GW[1] to GW[n] and the data signal) are substantially identical or similar to those described with reference to FIG. 7, and therefore, overlapping descriptions will not be repeated.

In the first frame period FRAME1 or before the first frame period FRAME1, a mode switching control signal C_LPM (see FIG. 6) for allowing the mode of the display device 100 to be switched from the first mode to the second mode may be provided to the timing controller 140.

The timing controller 140 may reverse-count pulses of the horizontal synchronization signal Hsync, and generate and output a start signal FLM at a seventh time t7 at which a counting value CV (or reverse-counting value) becomes 0. However, in the second mode, the timing controller 140 may output a start signal FLM having the logic low level in response to the vertical synchronization signal Vsync having the logic low level, without counting pulses of the horizontal synchronization signal Hsync.

Since the start signal, FLM is output simultaneously with the vertical synchronization signal Vsync, a second frame period FRAME2 (and a third frame period FRAME3) may include a porch period P_PORCH3 at which the scan signals GW[1] to GW[n] are not output. A width of the second frame period FRAME2 shown in FIG. 8 may be greater by the porch period P_PORCH3 than that of the second frame period FRAME2 shown in FIG. 7. When the third display area DA3 described with reference to FIG. 1 (or a number of the qth to nth scan lines SLq to SLn corresponding to the third display area DA3) is set smaller than the first display area DA1 described with reference to FIG. 1 (or a number of the first to pth scan lines SL1 to SLp corresponding to the first display area DA1), the width of the second frame period FRAME2 shown in FIG. 8 may be equal to that of the second frame period FRAME2 shown in FIG. 7.

At a thirteen time t13, the vertical synchronization signal Vsync may have a pulse having the logic low level, and the start signal FLM may have a logic low level, corresponding to the vertical synchronization signal Vsync. Subsequently, the first to pth scan signals GW[1] to GW[p] may sequentially have the logic low level.

Also, at the thirteen time t13, the (q+1)th scan signal GW[q+1] may have the logic low level. At a period between the thirteen time t13 and a fourteenth time t14, the (q+1)th to nth scan signals GW[q+1] to GW[n] corresponding to the third display area DA3 may sequentially have the logic low level.

As described with reference to FIG. 8, the start signal FLM, having the logic low level, is generated and output simultaneously with the vertical synchronization signal Vsync. Vsync, having the logic low level, is switched from the first mode to the second mode at the time at which the mode of the display device 100. Accordingly, the first delay time P_DELAY1 described with reference to FIG. 5 is decreased to a second delay time P_DELAY2 (e.g., a few horizontal times), and deterioration of display quality in the process of allowing the mode of the display device 100 to be switched from the first mode to a second mode, can be reduced or prevented.

In the display device in accordance with the present disclosure, when the display device is driven in a mode in which an image is displayed with low persistence, the start signal, a basis of a scan signal, can be generated earlier than the vertical synchronization signal or be generated simultaneously with the vertical synchronization signal. Thus, the display device can display a seamless image in the mode switching process.

While the present invention has been described in connection with the preferred embodiments, it will be understood by those skilled in the art that various modifications and changes can be made thereto without departing from the spirit and scope of the invention defined by the appended claims.

Thus, the scope of the invention should not be limited by the particular embodiments described herein but should be defined by the appended claims and equivalents thereof.

What is claimed is:

1. A display device comprising:

a display unit including scan lines and pixels coupled to the scan lines;

a timing controller configured to operate in a first mode and a second mode, and to generate a start signal based on a vertical synchronization signal; and a scan driver configured to generate a scan signal based on the start signal, and sequentially provide the scan signal to the scan lines, wherein the timing controller generates the start signal immediately after a pulse of the vertical synchronization signal is applied in the first mode, and generates the start signal before the pulse of the vertical synchronization signal is applied in the second mode.

2. The display device of claim 1, wherein a first frame period before the display device is switched from the first mode to the second mode includes two start signals, and the pulse of the vertical synchronization signal represents a start of a frame period.

3. The display device of claim 2, wherein, in the first frame period, the start signal has a second pulse immediately after the scan signal generated based on a first pulse of the start signal is provided to the scan lines.

4. The display device of claim 2, wherein a width of a second frame period in the second mode is smaller than that of the first frame period in the first mode.

5. The display device of claim 4, wherein the timing controller generates the start signal, based on a horizontal synchronization signal provided from the outside, wherein a period of the horizontal synchronization signal in the second mode is smaller than that of the horizontal synchronization signal in the first mode.

6. The display device of claim 5, wherein, in the second mode, a time interval from a time at which the start signal is generated to a time at which the pulse of the vertical synchronization signal is applied is equal to or smaller than three times of the period of the horizontal synchronization signal.

7. The display device of claim 5, wherein a number of pulses of the horizontal synchronization signal, which are included in the second frame period, is equal to that of pulses of the horizontal synchronization signal, which are included in the first frame period.

8. The display device of claim 7, wherein the timing controller includes:

a counter configured to output a counting value by counting a number of pulses of the horizontal synchronization signal, with respect to the vertical synchronization signal; and a start signal generator configured to generate the start signal by comparing the counting value with a predetermined value.

9. The display device of claim 8, wherein the counter counts a number of pulses of the horizontal synchronization signal in the first mode, and reverse-counts a number of pulses of the horizontal synchronization signal from a reference value in the second mode.

10. The display device of claim 1, wherein the start signal has a second pulse, while the scan signal generated based on a first pulse of the start signal is being provided to the scan lines in the second mode.

11. The display device of claim 10, wherein the scan signal is simultaneously provided to at least two of the scan lines in the second mode.

12. The display device of claim 11, wherein the display unit includes a first display area, a second display area, and a third display area, which are divided by some of the scan lines, wherein the first display area and the third display area display a color image in the first mode, and display a single color image in the second mode, wherein the start signal has the second pulse at a time at which the scan signal is provided to a second scan line corresponding to the second display area among the scan lines.

13. The display device of claim 12, wherein, in the second mode, the scan signal is simultaneously provided to a first scan line corresponding to the first display area and a third scan line corresponding to the third display area among the scan lines.

14. The display device of claim 13, further comprising a data driver configured to generate a data signal, wherein the display unit further includes data lines, wherein the pixels are coupled to the data lines, wherein the data driver provides the data lines with black data corresponding to a black color, while the scan signal is being provided to the first scan line corresponding to the first display area among the scan lines in the second mode.

15. A display device comprising:

a display unit including a plurality of scan lines and a pixel coupled to the scan lines;

a timing controller configured to operate in a first mode and a second mode, and to generate a start signal based on a vertical synchronization signal; and a scan driver configured to generate a scan signal based on the start signal, and sequentially provide the scan signal to the scan lines, wherein the timing controller generates the start signal immediately after a pulse of the vertical synchronization signal is applied in the first mode, and generates the start signal at a time at which a pulse of the vertical synchronization signal is applied in the second mode.

16. The display device of claim 15, wherein the display unit includes a first display area, a second display area, and a third display area, which are divided by some of the scan lines, wherein the first display area and the third display area display a color image in the first mode, and display a single color image in the second mode, wherein a number of first scan lines corresponding to the second display area among the scan lines is greater than that of second scan lines corresponding to the third display area among the scan lines.

17. A method of controlling a display device comprising:

selecting a first display mode;

transmitting a first vertical synchronization signal to a pixel;

transmitting a first start signal to the pixel after the first vertical synchronization signal based on the first display mode;

selecting a second display mode;

transmitting a second vertical synchronization signal to the pixel; and transmitting a second start signal to the pixel simultaneously to or before the second vertical synchronization signal based on the second display mode.

18. The method of claim 17, wherein the first display mode comprises a normal display mode and the second display mode comprises a low persistence mode (LPM).

19. The method of claim 18, wherein the second vertical synchronization signal is preceded by a vertical front porch (VFP) period and followed by a vertical back porch (VBP) period based on the second display mode.

20. The method of claim 17, wherein the first vertical synchronization signal and the first start signal are transmitted during a first horizontal synchronization period, and the second vertical synchronization signal and the second start signal are transmitted during a second horizontal synchronization period.

21. The display device of claim 1, wherein a timing at which the start signal is generated in the second mode with respect to pulses of the vertical synchronization signal is different from a timing at which the start signal is generated in the first mode with respect to the pulses of the vertical synchronization signal, and wherein a pulse width of the start signal in the second mode is equal to a pulse width of the start signal in the first mode.

22. The display device of claim 15, wherein a timing at which the start signal is generated in the second mode with respect to pulses of the vertical synchronization signal is different from a timing at which the start signal is generated in the first mode with respect to the pulses of the vertical synchronization signal, and wherein a pulse width of the start signal in the second mode is equal to a pulse width of the start signal in the first mode.

23. The method of claim 17, wherein a timing at which the second start signal is transmitted in the second display mode with respect to pulses of the second vertical synchronization signal is different from a timing at which the first start signal is transmitted in the first display mode with respect to pulses of the first vertical synchronization signal, and wherein a pulse width of the second start signal in the second display mode is equal to a pulse width of the first start signal in the first display mode.

* * * * *